United States Patent
Yamakawa et al.

(10) Patent No.: US 6,729,565 B2
(45) Date of Patent: May 4, 2004

(54) PROCESS FOR REUSING WASTE PAINT AND PROCESSOR THEREFOR

(75) Inventors: Tomihisa Yamakawa, Tokyo (JP); Kuniya Sonehara, Tokyo (JP); Takayuki Kawaguchi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 200 days.

(21) Appl. No.: 09/968,525

(22) Filed: Oct. 2, 2001

(65) Prior Publication Data

US 2002/0038829 A1 Apr. 4, 2002

(30) Foreign Application Priority Data

Oct. 3, 2000 (JP) ........................................ 2000-303053

(51) Int. Cl.⁷ ............................................... B02C 19/12
(52) U.S. Cl. .............................. 241/23; 241/29; 241/65; 241/152.2
(58) Field of Search ............................... 241/30, 23, 29, 241/65, 152.2

(56) References Cited

U.S. PATENT DOCUMENTS 3,941,315 A * 3/1976 Gribble et al. ................. 241/3
5,695,281 A * 12/1997 Weber et al. ................ 366/235
6,311,906 B1 * 11/2001 Kim ............................. 241/23

OTHER PUBLICATIONS

Copy of patent application Ser. No. 10/261,417, filed Oct. 2, 2002 to Kuniya Sonehara and Takayuki Kawaguchi.

* cited by examiner

*Primary Examiner*—Mark Rosenbaum
(74) *Attorney, Agent, or Firm*—Smith, Gambrell & Russell, LLP

(57) ABSTRACT

The present invention provides a process and processor for reusing waste paint (i.e., a process and processor for converting waste paint into resources) which bring about efficient processing of the waste paint. In the process for reusing the waste paint, the waste paint is rolled between a pair of heated rotating drums disposed opposite to each other, to dehydrate and dry the waste paint (rough drying step); and the dehydrated and dried waste paint is ground by a rotating grinding rotor of which axial is perpendicularly arranged in a processing tank and further the dehydrated and dried waste paint is dehydrated, dried and pulverized (main drying step).

14 Claims, 5 Drawing Sheets

--PRIOR ART--

--PRIOR ART--

--PRIOR ART--

PROCESS FOR REUSING WASTE PAINT AND PROCESSOR THEREFOR

BACKGROUND OF THE INVENTION

1. Field of the Invention

The present invention relates to a process and processor for reusing a waste paint discharged from processes such as coating process of applying paint to a vehicle body.

2. Description of the Related Art Including Information Disclosed under 37 CFR 1.97 and 1.98

For instance, in a paint shop, a vehicle body is painted out by spraying coatings in a paint booth. In spraying coatings, there is some coating liquid which is not adsorbed onto the vehicle body due to spray missing (overspray). The missing spray coating enters into circulating water in a pit on the lower side of the booth, and is led to a settling (precipitation, deposit) tank together with the water. After some time period, soft cake-like masses settle and these are collected as waste paints. The waste paint is burnt up, or otherwise is dried and ground as a processed waste paint which is generally used for asphalt sheets and chipping resistant coatings.

However, the waste paint collected in the paint booth is not cured because it is not passed through a curing process. Therefore it is necessary to completely cure the waste paint to pulverize it for its reuse.

Examples of processors for drying and pulverizing the waste paint include a screw drying machine, a stirring drying machine and a rolling drying machine. Methods for processing the waste paint by using the screw drying machine, the stirring dryer and the rolling dryer are explained below.

FIG. 4 is a schematic view for explaining the screw drying machine. In the screw drying machine 100, the waste paint placed in a hopper 101 is introduced into a screw dryer 105 by a screw conveyor 102 and a belt conveyor 103, and dried in the screw dryer 105 to be pulverized, whereby the waste paint can be converted into resources.

The screw dryer 105 is provided with a cylindrical processing tank 106 into which the paint waste is introduced by the belt conveyor 103, a rotating grinding rotor 107 having plural grinding rotors 107b mounted on a rotating axis 107a which is horizontally extended in a processing tank 106, and a screw conveyor 108 disposed on the lower side of the processing tank 106.

When the waste paint is introduced into the processing tank 106, the grinding of the waste paint is started by rotation of the rotating grinding rotor 107, and simultaneously its heating is started by steam. In the process of heating of the waste paint, the waste paint is melted to form a large mass having high viscosity (e.g., heated rice cakes). In this condition, the heating promotes the vaporization of a solvent in the waste paint to dry out the waste paint.

When the waste paint is heated, the curing of a resin component in the waste paint is proceeded, and as a result the cured waste paint is ground by the rotating grinding rotor 107. The ground waste paint (i.e., resin powder) is fed as resources from the lower side of the processing tank 106 by the screw conveyor 108.

On the other hand, the water and solvent contained in the waste paint are vaporized in the processing tank 106, and the vaporized water and solvent are liquefied or condensed by a heat exchanger 109 to be discharged as condensed liquid. In this case, hydrocarbon is removed and only nontoxic gas is discharged. A reference number 109a is a vacuum pump for reducing pressure in the heat exchanger 109.

FIG. 5 is a schematic view for explaining the stirring and drying machine. In the stirring and drying machine 110 provided with a stirring dryer 115, the waste paint placed in a hopper 101 is introduced into the stirring dryer 115 by a screw conveyor 102 and a belt conveyor 103 in the same manner as the screw drying machine 100, and similarly dried in the stirring dryer 115 to be pulverized, whereby the waste paint is converted into resources.

The stirring dryer 115 is provided with a cylindrical processing tank 116 having a bottom into which the paint waste is introduced by the belt conveyor 103, a rotating grinding rotor (grinder) 117 with grinding rotors 117b mounted on a rotating axis 117a which is perpendicularly extended in the processing tank 116, and an outlet 118 disposed on the lower side of the processing tank 116.

When the waste paint is introduced into the processing tank 116, grinding of the waste paint is started by rotation of the rotating and grinding rotor 117, and simultaneously its heating is started by the steam. In the course of heating the waste paint, the waste paint is melted to form large masses having high viscosity (e.g., heated rice cakes). In this condition, the heating promotes the vaporization of a solvent in the waste paint to dry out the waste paint.

When the waste paint is heated, the curing of a resin component in the waste paint is proceeded, and as a result the cured waste paint is ground by the grinding rotor 117. The ground waste paint (i.e., resin powder) is fed as resources from the outlet 118 provided on the lower of the processing tank 116.

Water and solvent contained in the waste paint are vaporized in the processing tank 116, and the vaporized water and solvent are liquefied or condensed by a heat exchanger 109 to form condensed liquid in the same manner as the screw drying machine 100, and hydrocarbon is removed to discharge only nontoxic gas into atmosphere.

FIG. 6 is a schematic view for explaining the rolling drying machine. In the rolling drying machine 120 having a rolling dryer 121, waste paint placed in a hopper 101 is introduced into the rolling dryer 121 by a screw conveyor 102 and a belt conveyor 103 in the same manner as the screw drying machine 100, and similarly dried in the rolling dryer 121 to be pulverized, whereby the waste paint is converted into resources.

The rolling dryer 121 is provided with a box-shaped processing tank 122 into which the paint waste is introduced by the belt conveyor 103, a pair of rotating drums 123 which are horizontally disposed opposite to each other in the processing tank 122 and which rotate in the opposite direction each other, a scraper blade 124 whose edge is contact with the surface of each of the drums 123, and a screw conveyor 125 disposed on the lower side of the processing tank 122.

A large mass of waste paint, which is introduced from the upper side of a processing tank 122, is fed between a pair of rotating drums 123 opposite to each other, rolled therebetween under heating, whereby drying and grinding are started. The rolled and dried waste paint is adhered onto the surface of the rotating drums 123 to be moved by rotation of the drums, and scratched up by the scraper blade 124. The scratched waste paint is fallen from the drums 123 and fed as resources from the lower side of the processing tank 121 by the screw conveyor 125.

Water and solvent contained in the waste paint are vaporized in the processing tank 121, and the vaporized water and solvent are liquefied or condensed by a heat exchanger 109 in the same manner as the screw drying machine 100, and hydrocarbon is removed to discharge only the nontoxic gas into the atmosphere.

SUMMARY OF THE INVENTION

According to a method for processing the waste paint using the screw drying machine shown in FIG. 4, the collected waste paint is stirred under heating by the rotating grinding rotor 107 within the processing tank 106 and therefore it is gradually cured. In a beginning stage of the curing, the waste paint is increased in viscosity to become high viscous (such as in the condition of heated rice cake), and therefore resistance for rotating of the rotating grinding rotor 107 is increased and subsequently power for driving the rotor (e.g., consumed power of electric motor) is also increased. For the reason, it is required to switch the rotation number (speed) of the rotating grinding rotor 107 to a low rate and much time is taken for reduction of water content of the waste paint.

Also in the method for processing the waste paint using the stirring and drying machine shown in FIG. 5, the collected waste paint is stirred under heating by the rotating grinding rotor 117 within the processing tank 116 and therefore it is gradually cured. In the beginning stage of the curing, the waste paint is increased in viscosity to become high viscous (such as in the condition of heated rice cake), and therefore the resistance to rotation of the rotating grinding rotor 117 is increased and subsequently the power for driving the rotor (e.g., consumed power of electric motor) is also increased. For the reason, it is required to switch the speed of the rotating grinding rotor 117 to a low rate and much time is taken for reduction of the water content of the waste paint.

According to a method for processing the waste paint using a rolling and drying machine shown in FIG. 6, the collected waste paint is rolled and heated between a pair of rotating drums 123 opposite to each other to be dried. However, much time is taken for obtaining waste paint having low water content of the waste paint by the rolling and dehydrating/drying by the rotating drums 123 and therefore it is difficult to successfully perform the method.

The method for processing waste paint using the screw, stirring or rolling drying machine requires much time and cost for processing the waste paint. Hence, an efficient method for processing the waste paint is desired As a result of many experiments, it was found that, in the drying stage of the waste paint by the stirring dryer, there are some relationships among variations of characteristics of the waste paint, that of stirring power, that of temperature of the waste paint and the water content.

The experiment was carried out as follows: 8 kg of the waste paint having 30% by weight was dried using a stirring dryer of volume of 20 L under the conditions of steam pressure of 5 kg/cm$^3$. As a result, the drying characteristics of the waste paint are shown in FIG. 7.

The drying characteristics of the waste paint of FIG. 7 indicates the followings: In the beginning stage of the curing of the waste paint by rotating the grinding rotor and by drying by heat, value of electric current for driving the rotor is rapidly increased due to high viscosity of the waste paint, and simultaneously the content of water in the waste paint is drastically reduced whereby the waste paint is made in critical state to be destroyed. As a result, the current value is suddenly lowered because of reduction of load of the electric motor, and then the current value is approximately kept in constant while the water content is gradually reduced. Hence, it is understood that the beginning stage using the waste paint having relative high content of the water requires high power.

On the other hand, the rolling dryer rolls the waste paint between a pair of rotating drums and therefore it is difficult to sufficiently reduce the content of water after the processing by rolling. However, it has been confirmed by the experiments that the continuous rolling of the waste paint enables efficient drying (dehydration) in the beginning stage in a short time by a relative low power.

In view of the above-mentioned drying characteristics of the stirring dryer and rolling dryer, an object of the invention is to provide a process and processor for reusing waste paint (i.e., a process and processor for converting waste paint into resources) which bring about efficient processing of the waste paint.

The present invention to attain the object is provided by a process for reusing a waste paint comprising:

rolling the waste paint between a pair of heated rotating drums disposed opposite to each other for dehydrating and drying the waste paint; and grinding the dehydrated and dried waste paint by a rotating grinding rotor of which axial is perpendicularly arranged in a processing tank for dehydrating, drying and pulverizing it.

According to the above-mentioned invention, the rough drying step includes heating and dehydrating/drying waste paint having relative high content of water by rolling it between a pair of heated rotating drums. In the rough drying by the use of the rotating drums, the rotating drums can be rotated at a constant rate, and power for dehydrating and drying the waste paint is extremely low, and further the characteristics of thermoset resin of the waste paint are destroyed.

In the main drying step, the waste paint roughly dried in the rough drying step is ground and dried by means of a rotating grinding rotor in a processing tank to convert into resources (materials). The waste paint in this main step is easily and efficiently ground at short time in a low power because the characteristics of thermoset resin of the waste paint are already destroyed in the rough drying step.

Hence, the process of the invention enables the waste paint to convert into pulverized waste paint suitable for resources in extremely less energy, whereby the reuse of the waste paint can be easily and efficiently performed. Another embodiment to attain the object is provided by a processor for reusing a waste paint comprising:

a rolling dryer comprising a pair of heatable rotating drums disposed opposite to each other for rolling the waste paint introduced therebetween to dehydrate and dry it, and a stirring and grinding rotor for grinding the dehydrated and dried waste paint to dehydrate, dry and pulverize it; and a processing tank provided with the grinding rotor whose axis is perpendicularly arranged in the tank. it.

According to the above-mentioned invention, by using the processor provided with the rolling dryer which heats and dehydrates/dries the waste paint having relative high content of water by rolling it between a pair of heated rotating drums, and a stirring dryer which grinds and dries the waste paint whose characteristics of thermoset resin are destroyed to convert into resources (materials), the process described above can be advantageously performed.

In the processor, the rolling dryer is preferably provided with a scraper blade in the form of plate which is arranged on each of the rotating drums in the width direction of the drum and whose edge is in contact with the surface of each of the drums to scratch up the dehydrated and dried waste paint on the drums.

In case of the use of the above-mentioned rolling dryer, the dried waste paint adhered onto the surface of the rotating drums can be easily scratched up by the scraper blade with rotating of the drums whereby the processing of the waste paint by the rolling dryer can be efficiently performed.

In the processor, the scraper blade preferably has plural cutter blades which are arranged at predetermined intervals each other along the edge of the scraper blade in the direction perpendicular to the edge.

In case of the use of the scraper blade, the plural cutter blades cut the waste paint scrapped from the surface of the rotating drums, and therefore handling when the waste paint is fed to the stirring dryer is easy, whereby the processing of the waste paint can be efficiently performed.

DETAILED DESCRIPTION OF THE INVENTION

The embodiments of the process and processor for reusing waste paint according to the invention are explained with reference to Figures.

First Embodiment

Figure 1:
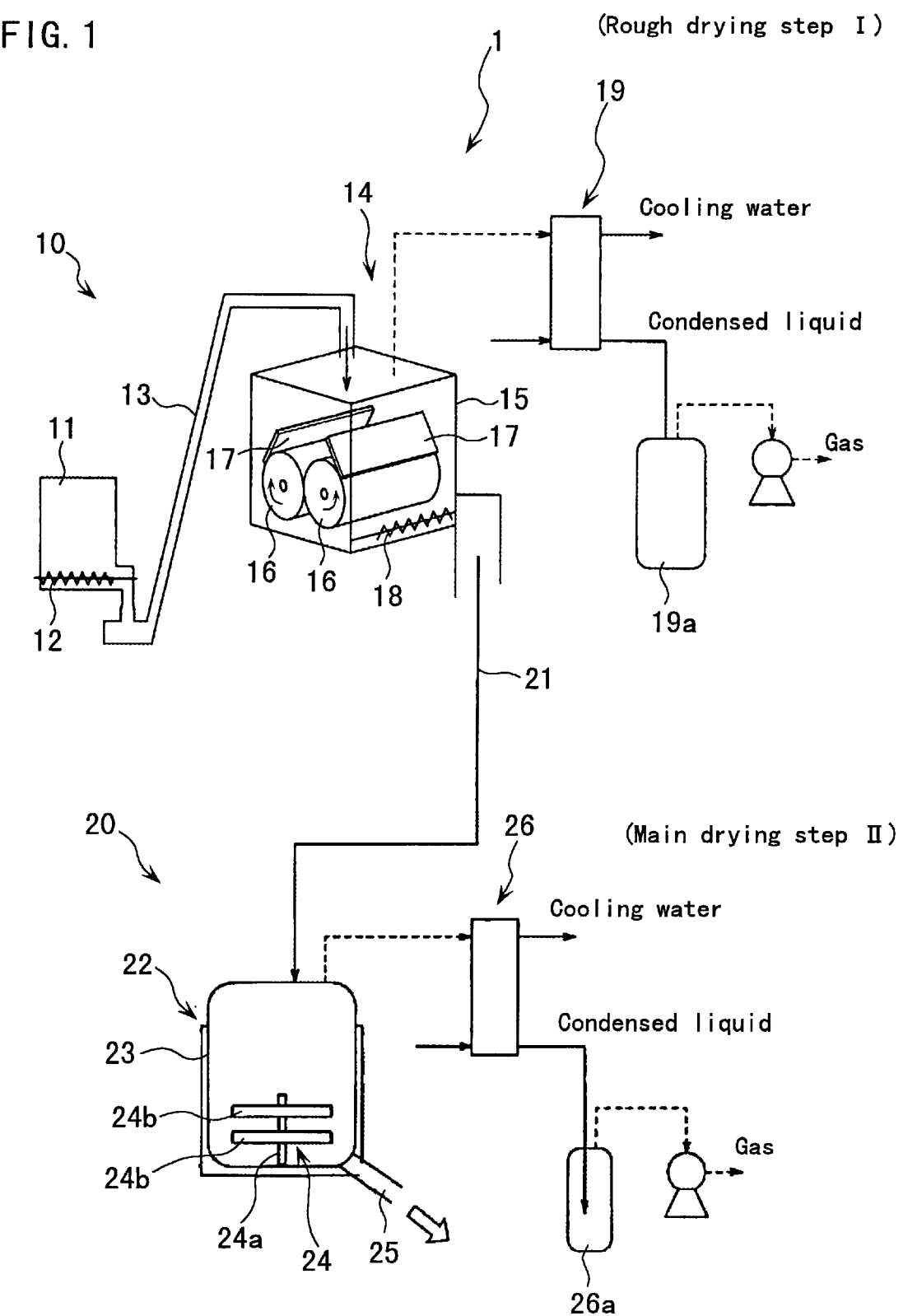
FIG. 1 is a schematic view for explaining a first embodiment of a process or processor for reusing waste paint according to the present invention.

The first embodiment of the invention is explained with reference to FIG. 1. FIG. 1 is a schematic view for explaining the processor for reusing waste paint 1 according to the first embodiment, which is provided with a rough (preparatory) drying section 10 and a main drying section 20.

In the rough drying section 10, a collected waste paint is placed in a hopper 11, the placed waste paint is fed to a rolling dryer 14 by conveying equipments such as a screw conveyor 12 and a belt conveyor 13, and the waste paint roughly dried by the rolling dryer 14 is fed to a main drying section 20.

The rolling dryer 14 is provided with a box-shaped processing tank 15 into which the waste paint fed by the belt conveyor 13 is placed, a pair of rotating drums 16 horizontally disposed opposite to each other in gap (opening) of several mm or less, a scraper blade 17 in the form of plate which is arranged on the rotating drums 16 so as to extend in an axial direction of the drum and whose edge is in contact with an outer surface of the drum 16 throughout the whole width, and a screw conveyor 18 provided on a lower side of a first processing tank 15. Steam is fed to the inside of each of the rotating drums 16 to heat the drums.

A first heat exchanger 19 is provided in the vicinity of the rolling dryer 14. Water and solvent vaporized in the first processing tank 15 are liquefied or condensed in the first heat exchanger 19, and further hydrocarbons are removed to discharge only nontoxic gas in the first heat exchanger 19. A first vacuum pump 19a causes reduction of an internal pressure in the first heat exchanger 19.

A main drying section 20 is provided with, for example, a pneumatic conveyor 21 for conveying the waste paint 1 with air, the waste paint 1 being roughly dried by the rolling dryer 14, and further the stirring dryer 22 for mainly drying and grinding the waste paint 1 that is roughly dried in the rough drying section 10 and conveyed by the pneumatic conveyor 21 to pulverize the waste paint 1.

The stirring dryer 22 is provided with a cylindrical processing tank 23 having a bottom into which the paint waste 1 conveyed by the pneumatic conveying machine 21 is introduced, a rotating grinding rotor 24 having grinding rotors 24b mounted on a rotating axis 24a which is arranged to be perpendicularly extended in the processing tank 23, and an outlet 25 disposed on the lower side of the processing tank 23.

A second heat exchanger 26 is provided in the vicinity of the stirring dryer 22. The water and solvent vaporized in the processing tank 23 are liquefied or condensed in the second heat exchanger 26, and hydrocarbons are further removed to discharge only the nontoxic gas in the heat exchanger 26. A second vacuum pump 26a causes reduction of pressure in the heat exchanger 26.

Subsequently, the operation of the processor for reusing the waste paint 1 having an above structure is explained.

In the rough drying step I, the waste paint collected in a setting tank and the like (e.g., the waste paint 1 having water content of 50% by weight) is introduced into the hopper 11 of the rough drying section 10, and further conveyed by the screw conveyor 12 and the belt conveyor 13 to the upper side of a rolling dryer 14 to be introduced into the processing tank 15 of the rolling tank. The waste paint introduced into the first processing tank 15 is passed between a pair of heated rotating drums 16 disposed opposite to each other to be rolled by a shear action given by the rotating drums 16, and consequently heated by the drums to be dehydrated and dried, whereby the water content of the waste paint 1 attains to about 10% by weight. For the rough drying step, the rotating drums 16 are rotated at a constant rate, and therefore the power required for dehydrating and drying of the waste paint 1 is extremely low.

The waste paint 1 dehydrated and dried by rolling between the drums 16 is adhered in the form of sheet or foil onto the surface of the rotating drums 16 by the rolling of the drums. Thereafter, the sheet or foil shaped waste paint is scratched up by the scraper blade 17 whose edge is in contact with the surface of the rotating drums 16 to be fallen onto a bottom of the first processing tank 15. The scratching up of the waste paint 1 from the rotating drum 16 by the scraper blade 17 can be easily and efficiently carried out because the thermoset characteristics of the waste paint 1 is already destroyed by heating (drying).

On the other hand, water and solvent vaporized in the first processing tank 15 are liquefied or condensed in the first heat exchanger 19, and further the hydrocarbons are removed to discharge only the nontoxic gas to the atmosphere.

The waste paint roughly dried in the rough drying step is conveyed from the bottom of the processing tank 15 by the screw conveyor 18, and introduced into the second processing tank 23 by the air conveying machine 21, whereby the introduced waste paint is dried and ground in the main drying stem II to pulverize it.

In the main drying step II, the roughly dried waste paint 1 is ground and dried by means of a grinding rotor 24 rotating at a high rate (speed) in the processing tank 23 to be pulverized, and the resultant pulverized waste paint, i.e., resin powder, is discharged from the outlet 25 as resources (materials). The waste paint 1 in this main step can be easily destroyed by the rotating grinding rotor 24 because the characteristics of thermoset resin of the waste paint 1 are already destroyed in the rough drying step, whereby the waste paint 1 is efficiently pulverized at short time in a low power to give resources.

On the other hand, the water and solvent contained in the waste paint 1 are vaporized in the second processing tank 23 and the vaporized water and solvent are liquefied or condensed in the heat exchanger 26, and further the hydrocarbons are removed to discharge only the nontoxic gas to the atmosphere.

EXAMPLE 1

In the above rough drying step, the gap of the rotating drums 16 opposite to each other in the rolling dryer 14 is 0.25 mm, the temperature of the surface of each of the drums 16 is 150° C., and the rotation rate of the surface of each of the drums 16 is 3 rpm, and the area for heat transfer of the surface is 1.2 m². Into the rolling dryer 14 as defined above, the waste paint 1 having water content of 50% by weight was introduced, and dehydrated and dried. The waste paint was processed for 80 minutes. The resultant waste paint had water content of 7.7% by weight and its weight was 49 kg. The maximum of power in this procedure was 1 kW.

The waste paint 1 having water content of 7.7% by weight was conveyed to the stirring dryer 22, and dehydrated and dried for 70 minutes. As a result, the powder waste paint having water content of 0.95% by weight was obtained. The maximum of driving power required for the rotating grinding rotor 24 in this procedure was 8 kW.

EXAMPLE 2 (Comparison)

The rough drying step was performed as follows: In the stirring dryer 22 having the area for heat transfer of the surface is 1.2 m², the waste paint having water content of 50% by weight was introduced, and dehydrated and dried. The waste paint was processed for 80 minutes. The resultant waste paint had water content of 6.2% by weight. The maximum of power in this procedure was 19.4 kW.

In comparison Example 1 with Example 2 in the rough drying step, Example 2 using the stirring dryer 22 required the maximum of the driving power of the stirring dryer of 19.4 kW for dehydration and drying in the approximately same condition as Example 1. Example 1 required only 1 kW, which corresponds to 5.2% based on Example 2. Hence, the process of the invention brings about extremely reduction of the driving power.

For the reason, the process of the invention comprising the rough drying step using the rolling dryer and the main drying step using the stirring dryer 22 brings about a sharp reduction of the driving energy, and gives the powder waste paint having optimum water content of 0% level. Thus, the process of the invention enables easy and efficient processing for reuse of waste paint.

Second Embodiment

The second embodiment of the invention is explained with reference to FIGS. 2 and 3. The explanations as to components in FIGS. 2 and 3 corresponding to those in FIG. 1 are omitted by marking the same reference number as FIG. 1, whereas the different reference numbers are mainly explained.

Figure 2:
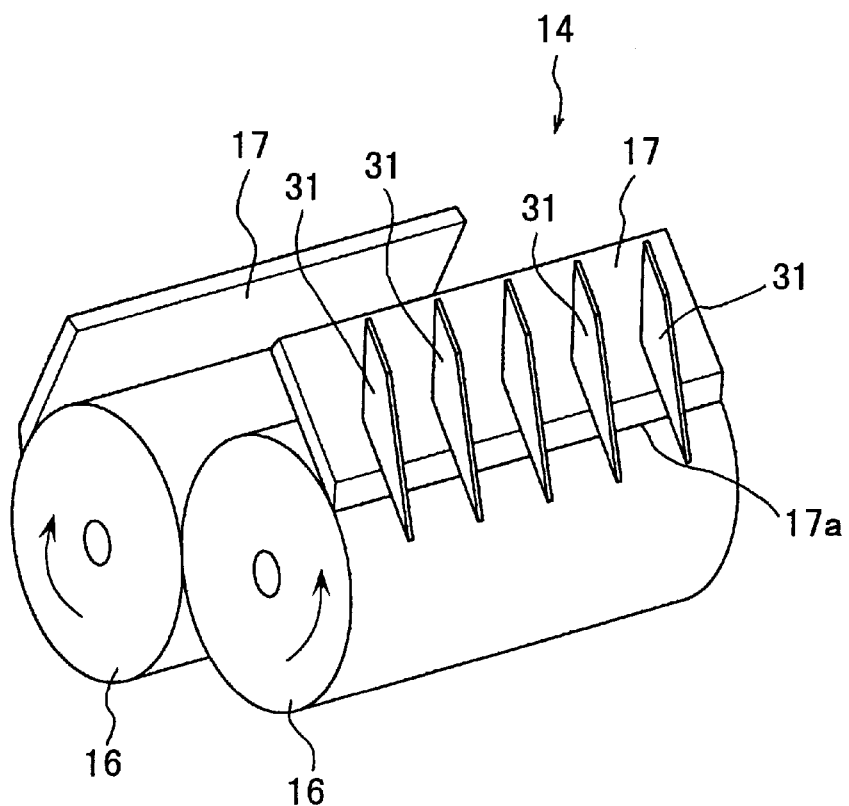
FIG. 2 is a schematic view for explaining a second embodiment of the process or processor for reusing waste paint according to the invention.
Figure 3:
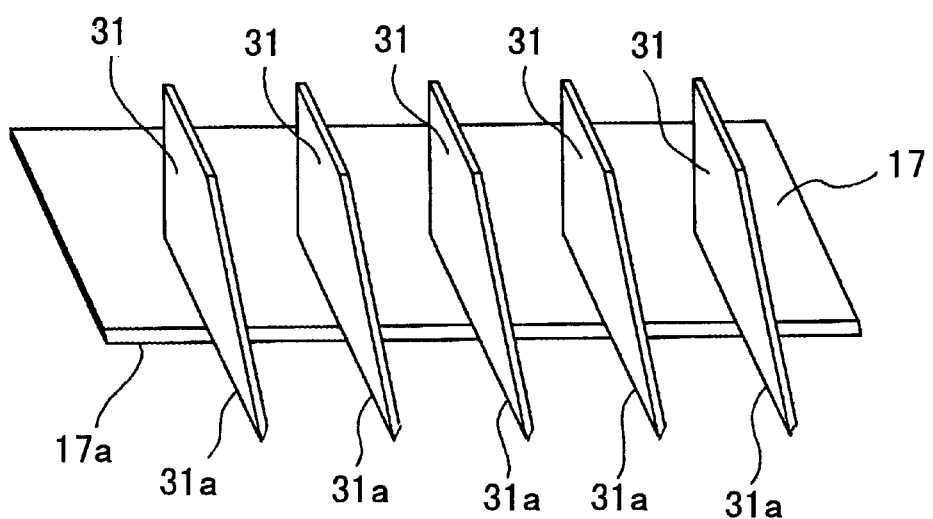
FIG. 3 is a schematic view for explaining the scraper blade according to the invention.
Figure 4:
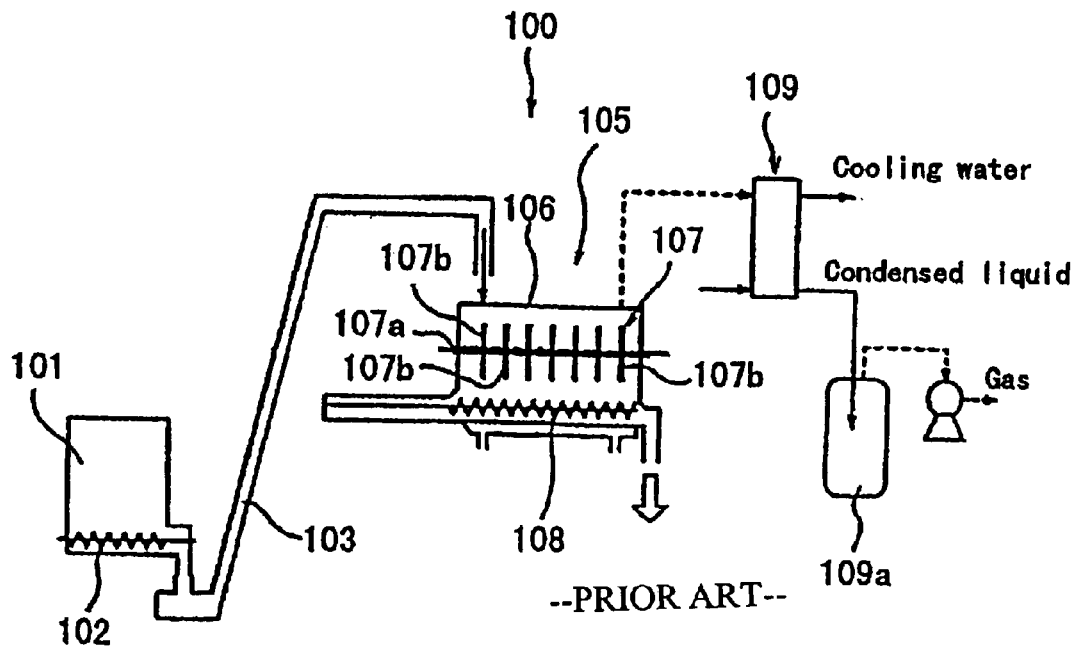
FIG. 4 is a schematic view for explaining the process for reusing waste paint using a conventional screw drying machine.
Figure 5:
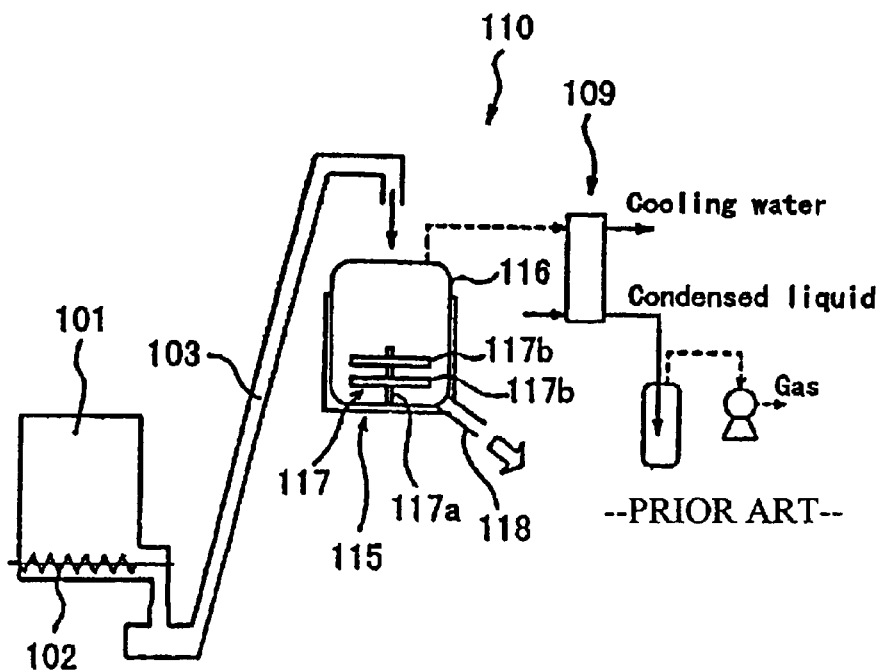
FIG. 5 is a schematic view for explaining the process for reusing waste paint using a conventional stirring drying machine.
Figure 6:
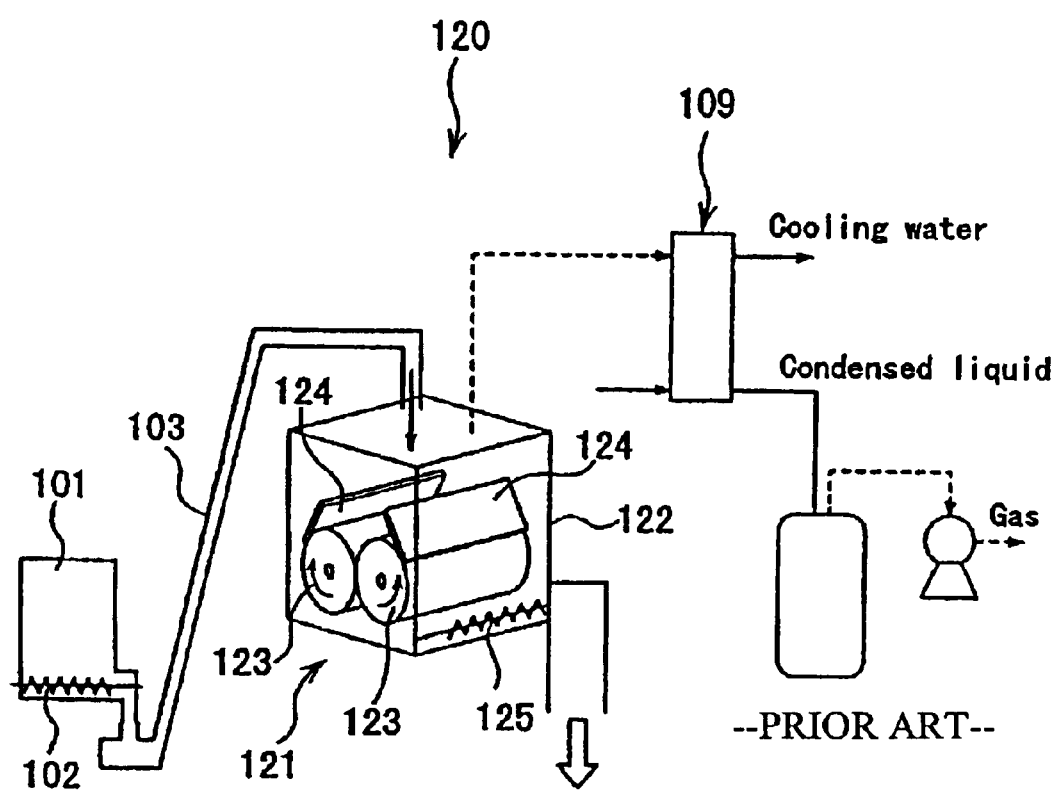
FIG. 6 is a schematic view for explaining the process for reusing waste paint using a conventional rolling drying machine.
Figure 7:
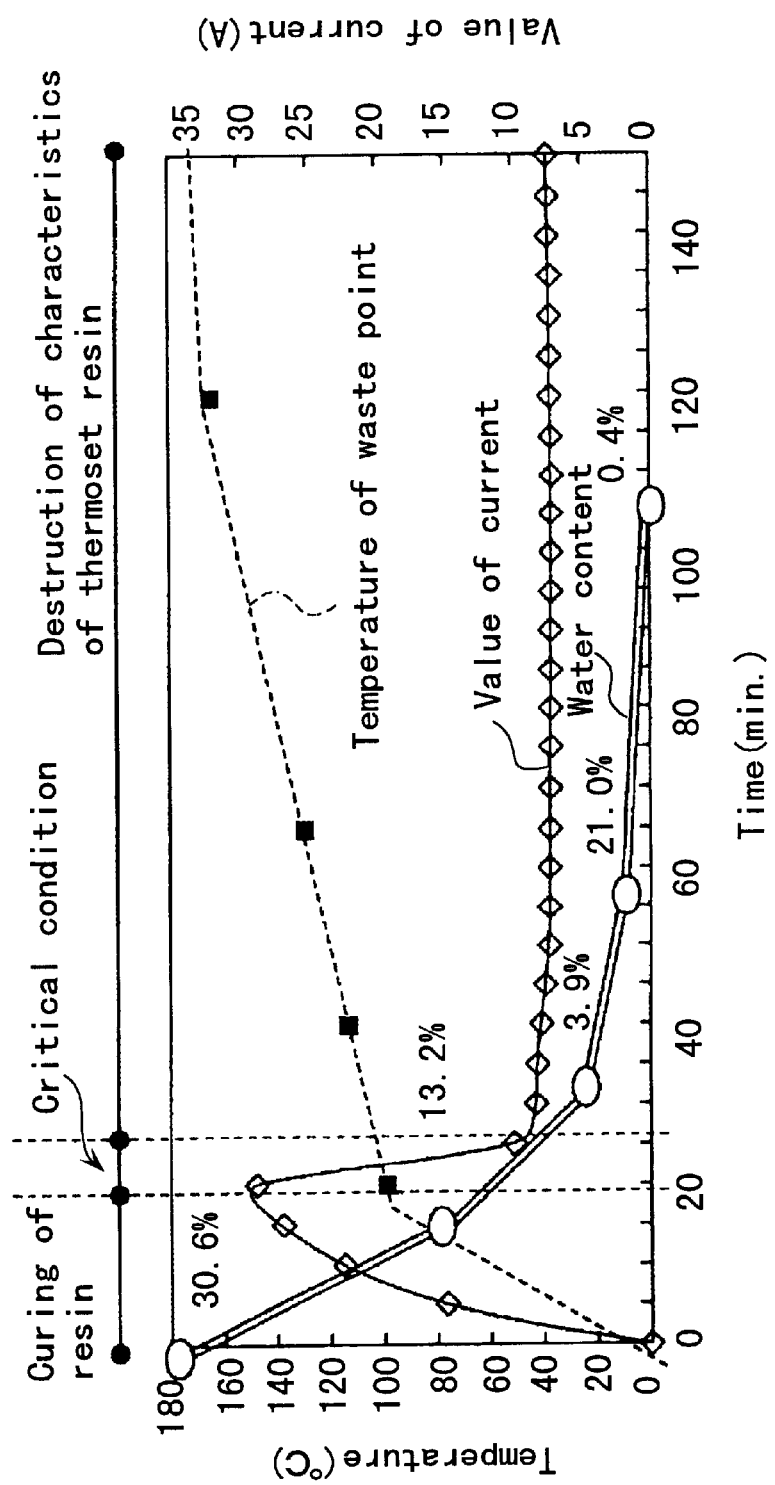
FIG. 7 is a view for explaining the drying characteristics of the waste paint in case of using a conventional stirring and drying machine.

FIG. 2 is an enlarged view of key portion of the rolling dryer 14 of FIG. 1. The scraper blade 17 in the form of plate is provided throughout the overall width of the outer surface of each of the rotating drums 16 such that its edge 17a is in contact with the outer surface, and further plural cutter blades 31 are provided on the scraper blade 17. The cutter blades 31 in the form of plate are arranged to extend in the rotating direction of the rotating drums 16, and further arranged at equal intervals (e.g., 50 mm) each other on the outer surface of each of the rotating drums 16. The edge of each of the cutter blades 31 combined to the outer surface of the scraper blade 17 is protruded from the edge 17a of the scraper blade 17 and the lower edge of the protruded portion forms cutter edge 31a.

By the provision of the plural cutter blades 31 on the scraper blade, the sheet or foil waste paint adhered to the surface of the rotating drums 16 can be scratched up from the surface of the rotating drums 16 by the edge 17a of the scraper blade 17, and simultaneously cut off in the width of the interval of the cutter blades 31 by the cutter blades. Therefore, conveying to the following step, for example conveying to the stirring dryer 22 by means of the screw convey provided on the lower side of the first processing tank 15 or the pneumatic conveyor machine 21 can be smoothly performed, whereby efficiency of reusing the waste paint 1 is further enhanced.

EXAMPLE 3

The plural cutting blades 31 were attached to the scraper blade 17 at the intervals of 50 mm, and the scraper blade was mounted in the rolling dryer 14, in which the gap of the rotating drums 16 opposite to each other is 0.25 mm, the temperature of the surface of each of the drums is 150° C., and the rotation rate of the surface of each of the drums is 3 rpm, and the area for heat transfer of the surface is 1.2 m². Into the rolling dryer 14 as defined above, the waste paint 1 having water content of 50% by weight was introduced, and dehydrated and dried. The resultant waste paint 1 was in the form of approximately column (diameter: 40 mm, length: 50 mm) and had water content of 2.7% by weight, which could be smoothly conveyed to the subsequent stirring dryer 22 by the screw conveyor 18 and the pneumatic conveying machine 21.

EXAMPLE 4

The cutting blades 31 were attached to the scraper blade 17 at intervals of 50 mm, and the scraper blade 31 was mounted in the rolling dryer 14, in which the gap of the rotating drums 16 opposite to each other is 0.25 mm, the temperature of the surface of each of the drums 16 is 150° C., and the rotation rate of the surface of each of the drums is 1.2 rpm. Into the rolling dryer 14 as defined above, the waste paint 1 having water content of 40% by weight was introduced, and dehydrated and dried. The resultant waste paint was in the form of approximately column (diameter: 20 mm, length: 50 mm) and had water content of 2.7% by weight, which could be smoothly conveyed to the subsequent stirring dryer 22 by the screw conveyor 18 and the pneumatic conveying machine 21.

While the presently preferred embodiment of the present invention has been shown and described, it is to be understood that these disclosure are for the purpose of illustration only and that various changes and modifications may be made without departing from the scope of the invention as set forth in the appended claims. For example, though the rolling dryer 14 of the rough drying section 10 and the stirring dryer 22 of the main drying section 20 in the embodiment are connected with each other by the screw conveyor 18 and the pneumatic conveying machine 21, the rough drying section 10 and the main drying section 20 can be separated from each other to convert the waste paint 1 to resources according to capacity of each of the sections. Further the gap of the rotating drums 16 opposite to each other in the rolling dryer, the rotation number (rate) of the rotating drums 16, the distance of the intervals of the cutting blades 31 attached to the scraper blade 17 can be appropriately changed according to the processing conditions.

Effect of the Invention

According to the process for reusing the waste paint 1 of the present invention, the rough drying step includes heating and dehydrating/drying waste paint having relative high content of water by rolling it between a pair of the heated rotating drums and brings about destruction of the characteristics of the thermoset resin of the waste paint, and the main drying step includes grinding and drying the waste paint 1 roughly dried in the rough drying step by the rotating grinding rotor being rotated in the processing tank to convert into resources (materials). Thereby, the powder waste paint can be easily and efficiently dried and pulverized at short time in a low power, and thus the process of the invention enables the waste paint to convert into pulverized waste paint suitable for the resources in extremely less energy.

According to the processor for reusing the waste paint 1 of the present invention, by using the processor provided with the rolling dryer which heats and dehydrates/dries the waste paint 1 having relative high content of water by rolling it between a pair of the heated rotating drums and which brings about destruction of the characteristics of the thermoset resin of the waste paint, and a stirring dryer which grinds and dries the waste paint 1, whose characteristics of thermoset resin is destroyed, by the rotating grinding rotor in the processing tank to convert into the resources (materials), the process described above can be advantageously performed.

The disclosure of the Japanese priority application No. 2000-303053, dated Oct. 3, 2000, is hereby incorporated by reference.

We claim:

1. A process for recycling a waste paint comprising:
   rolling the waste paint between a pair of heated rotating drums disposed opposite to each other for dehydrating and drying the waste paint; and
   grinding the dehydrated and dried waste paint by a rotating grinding rotor having an axis perpendicularly arranged in a processing tank for dehydrating, drying and pulverizing the waste paint.

2. The process for recycling the waste paint as defined in claim 1, wherein the axis is vertically arranged.

3. A processor for recycling a waste paint comprising:
   a rolling dryer comprising a pair of heatable rotating drums disposed opposite to each other for rolling the waste paint introduced therebetween to dehydrate and dry the waste paint;
   a stirring and grinding rotor for grinding the dehydrated and dried waste paint to dehydrate, dry and pulverize the waste paint; and
   a processing tank provided with the grinding rotor whose axis is perpendicularly arranged in the tank.

4. The processor for recycling the waste paint as defined in claim 3,
   wherein the rolling dryer is provided with a scraper blade in the form of a plate which is arranged on each of the rotating drums in a lateral direction of the drums, said scraper blade having an edge that is in contact with a surface of each of the drums to scratch up the dehydrated and dried waste paint on the drums.

5. The processor for recycling the waste paint as defined in claim 3,
   wherein the rolling dryer is provided with a scraper blade in the form of a plate which is arranged on each of the rotating drums in a lateral direction of the drums, said scraper blade having an edge that is in contact with a surface of each of the drums to scratch up the dehydrated and dried waste paint on the drums, said scraper blade having a plural cutter blades arranged at predetermined intervals along the edge of the scraper blade.

6. A process for recycling a waste paint comprising:
   rolling the waste paint between a pair of heated rotating drums disposed opposite to each other for dehydrating and drying the waste paint, the drums being provided with a scraper blade in the form of a plate which is arranged on each of the rotating drums in a lateral direction of the drums;
   scratching up the dehydrated and dried waste paint by the scraper blade whose edge is in contact with a surface of each of the drums; and
   grinding the dehydrated and dried waste paint by a rotating grinding rotor having an axis perpendicularly arranged in a processing tank for dehydrating, drying and pulverizing the waste paint.

7. The processor for recycling the waste paint as defined in claim 3, wherein the axis is vertically arranged.

8. A process for recycling a waste paint comprising:
   heating a pair of rotating drums;
   rolling the waste paint between the pair of rotating drums to dehydrate and dry the waste paint;
   removing dehydrated and dried waste paint from the pair of rotating drums;
   delivering the dehydrated and dried waste paint removed from the pair of rotating drums to a stirring, grinding, and pulverizing device having a rotor positioned within a stirring, grinding and pulverizing processing tank; and
   stirring, grinding, and pulverizing the dehydrated and dried waste paint with said rotor.

9. The method of claim 8, wherein the rotating drums are contained in a rotating drum processing tank, and delivering the dehydrated and dried waste paint includes delivering the dehydrated and dried waste from an outlet of said rotating drum processing tank directly to said stirring, grinding and pulverizing processing tank.

10. The method of claim 9, wherein said delivery includes using a pneumatic conveyor extending between said rotating drum processing tank and said stirring, grinding and pulverizing processing tank.

11. The method of claim 8, wherein removing the waste paint from the heated rotating drums includes scraping waste paint sheets off said roller drums with scrapers.

12. A processor for recycling a waste paint comprising:
   a rolling dryer comprising a pair of heatable rotating drums disposed opposite of each other for rolling waste paint introduced therebetween to dehydrate the waste paint; and a rolling drum processing tank within which said rotating drums are supported;

a stirring, grinding, and pulverizing processing tank having a rotor for stirring, grinding and pulverizing dehydrated and dried waste paint received from said rolling dryer; and a conveyor for conveying waste paint from said rolling drum processing tank to said stirring, grinding and pulverizing processing tank.

13. The processor as reciting in claim 12, wherein said conveyor is a pneumatic conveyor.

14. The processor as recited in claim 12, further comprising:

scrapers positioned relative to said rotating drums for removing sheets of waste paint accumulated on said rotating drums.

\* \* \* \* \*